US010642015B2

(12) United States Patent
Lippert et al.

(10) Patent No.: US 10,642,015 B2
(45) Date of Patent: May 5, 2020

(54) LIGHT SHEET MICROSCOPE WITH A PHASE-SELECTIVE ELEMENT FOR ILLUMINATION

(71) Applicant: Carl Zeiss Microscopy GmbH, Jena (DE)

(72) Inventors: Helmut Lippert, Jena (DE); Tobias Kaufhold, Jena (DE); Thomas Kalkbrenner, Jena (DE); Joerg Siebenmorgen, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 15/558,606

(22) PCT Filed: Mar. 11, 2016

(86) PCT No.: PCT/EP2016/055235
§ 371 (c)(1),
(2) Date: Sep. 15, 2017

(87) PCT Pub. No.: WO2016/146503
PCT Pub. Date: Sep. 22, 2016

(65) Prior Publication Data
US 2018/0081159 A1 Mar. 22, 2018

(30) Foreign Application Priority Data
Mar. 16, 2015 (DE) .......... 10 2015 103 802

(51) Int. Cl.
*G02B 21/06* (2006.01)
*G02B 21/10* (2006.01)
(Continued)

(52) U.S. Cl.
CPC ............. *G02B 21/10* (2013.01); *G02B 21/16* (2013.01); *G02B 21/367* (2013.01)

(58) Field of Classification Search
CPC ...... G02B 21/10; G02B 21/16; G02B 21/367; G02B 21/0032; G02B 21/0036;
(Continued)

(56) References Cited

U.S. PATENT DOCUMENTS 5,734,498 A * 3/1998 Krasieva ............... G02B 21/06
359/368
7,554,725 B2 6/2009 Stelzer et al.
(Continued)

FOREIGN PATENT DOCUMENTS

DE 102 57 423 6/2004
DE 10 2012 013 163 4/2014
(Continued)

OTHER PUBLICATIONS

Notification of Transmittal of Translation of the International Preliminary Report on Patentability dated Sep. 28, 2017 for application No. PCT/EP2016/055235 filed on Mar. 11, 2016.
(Continued)

*Primary Examiner* — Arnel C Lavarias
(74) *Attorney, Agent, or Firm* — Haug Partners LLP

(57) ABSTRACT

A light sheet microscope which includes an illumination apparatus generating coherent illumination light for several illumination wavelengths, a beam-shaping module generating a light sheet from illumination light, an illumination objective illuminating a specimen with the light sheet and a detection objective for imaging light which is emitted by the specimen onto a laminar detector, wherein the optical axes of the detection objective and of the illumination objective are not parallel to each other. In such a light sheet microscope, the beam-shaping module includes a phase-selective element with several selection areas separated from each other spatially, wherein in each case one selection area is assigned to one specific illumination wavelength, and
(Continued)

wherein a phase distribution predefined for the respective illumination wavelength is impressed on each selection area. The beam-shaping module further includes means for the sequential or simultaneous selection of the selection areas in dependence on the respective illumination wavelength.

25 Claims, 6 Drawing Sheets

(51) Int. Cl.
*G02B 21/16* (2006.01)
*G02B 21/36* (2006.01)

(58) Field of Classification Search
CPC ............ G02B 21/00; G02B 21/0004; G02B 21/0012; G02B 21/002; G02B 21/0024; G02B 21/0052; G02B 21/006; G02B 21/0064; G02B 21/0068; G02B 21/0076; G02B 21/06; G02B 21/08; G02B 21/36; G02B 21/361
USPC ....... 359/370, 385, 362, 363, 368, 369, 372, 359/386, 388, 390, 434, 435
See application file for complete search history.

(56) References Cited

U.S. PATENT DOCUMENTS

| | | | |
|---|---|---|---|
| 9,386,236 B2* | 7/2016 | Muller | G01J 3/2803 |
| 10,247,934 B2* | 4/2019 | Kalkbrenner | G02B 21/0032 |
| 2012/0206798 A1 | 8/2012 | Knop et al. | |
| 2013/0286181 A1 | 10/2013 | Betzig et al. | |
| 2013/0335818 A1* | 12/2013 | Knebel | G01N 21/6458 359/385 |
| 2015/0168732 A1 | 6/2015 | Singer et al. | |
| 2015/0260978 A1* | 9/2015 | Cremer | G02B 21/0004 348/79 |

FOREIGN PATENT DOCUMENTS

| | | |
|---|---|---|
| DE | 10 2014 119 255 | 6/2016 |
| WO | WO 2004/053558 | 6/2004 |
| WO | WO 2012/110488 | 8/2012 |
| WO | WO 2012/122027 | 9/2012 |
| WO | WO 2013/010151 | 1/2013 |
| WO | WO 2014/005682 | 1/2014 |
| WO | WO 2016/096303 | 6/2016 |

OTHER PUBLICATIONS

German Search Report of the German Priority Application No. 10 2014 119 255.9 dated Nov. 4, 2015.
International Search Report for Application No. PCT/EP2015/076939 dated Jun. 10, 2016.
Written Opinion of the International Searching Authority for International Application No. PCT/EP2015/076939 dated Mar. 16, 2015.
Article of B.-C. Chen et al. "*Lattice light-sheet microscopy: Imaging molecules to embryos at high spatiotemporal resolution*", Science, Bd. 346, No. 6208, Oct. 24, 2014 p. 1257998-1257998 & Bd.346, No. 6208, Oct. 23, 2014, p. 1257998-1257998.
Article of K. Mohan et al. "*Three Dimensional Fluorescence Imaging Using Multiple Light-Sheet Microscopy*", Plos One vol. 9, No. 6, Jun. 9, 2014, p. e96551.
Article of D. Dan et al. "*DMD-based LED-illumination Super-resolution and optical sectioning microscopy*", Scientific Reports vol. 3, Jan. 23, 2013.
Article of V. Kettunen et al., "*Propagation-invariant spot arrays*", Optics Letters 23(16), p. 1247, 1998.
Article of A. Rohrbach et al., "*A line scanned light-sheet microscope with phase shaped selfreconstructing beams*", Optics Express 18, p. 24229, 2010.
Getman Search Report for Application No. 10 2015 103 802.1 dated Nov. 4, 2015.
International Search Report for Application No. PCT/EP2016/055235 dated Jun. 10, 2016.
Written Opinion of the International Searching Authority for Application No. PCT/EP2016/055235 dated Jun. 10, 2016.

* cited by examiner a)

b)

a)

b)

LIGHT SHEET MICROSCOPE WITH A PHASE-SELECTIVE ELEMENT FOR ILLUMINATION

RELATED APPLICATION

This application is a 371 of PCT/EP2016/055235, filed on Mar. 11, 2016, which claims priority to Germany Application No. 102015103802.1 filed on Mar. 16, 2015, the entireties of which are incorporated herein by reference.

FIELD OF THE INVENTION

The invention relates to a method for examining a specimen by means of light sheet microscopy and addresses, among other things, the problem of analysing specimens which are marked with several dyes.

STATE OF THE ART

The examination of biological specimens, in which the illumination of the specimen is effected by means of a light sheet, the plane of which—the light sheet plane—intersects the optical axis of the detection—the detection direction—at an angle different from zero, has recently gained in importance. The light sheet plane usually forms an angle different from zero, often—but not necessarily—a right angle, with the detection direction, which as a rule corresponds to the optical axis of the detection objective. Such examination methods are predominantly used in fluorescence microscopy and are subsumed under the term LSFM (Light Sheet Fluorescence Microscopy). One example is the method described in DE 102 57 423 A1 and in WO 2004/0535558 A1, which builds on the latter, and referred to as SPIM (Selective Plane Illumination Microscopy), with which three-dimensional images even of thicker specimens can be generated within a relatively short period of time: on the basis of optical sections combined with a relative movement in a direction perpendicular to the section plane, a visual/three-dimensionally expanded representation of the specimen is possible.

Compared with other established methods, such as confocal laser scanning microscopy or two-photon microscopy, LSFM methods have several advantages. Since the detection can take place in wide field, larger specimen areas can be captured in a short period of time. Although the resolution is slightly lower than in confocal laser scanning microscopy, thicker specimens can be analysed with the LSFM technique, as the penetration depth is greater. In addition, the exposure of the specimen to light is the lowest in this method, which reduces the risk of bleaching of a specimen since the specimen is only illuminated by a thin light sheet at an angle to the detection direction which is different from zero.

Instead of a purely static light sheet, a quasi-static light sheet can also be generated by rapidly scanning the specimen with a light beam. The light sheet-type illumination is formed by subjecting the light beam to a very rapid movement relative to the specimen to be observed and stringing several together sequentially over time. Here, the integration time of the camera on the sensor of which the specimen is imaged can be chosen such that the scanning is completed within the integration time.

One of the main applications of light sheet microscopy is the imaging of medium-sized organisms of from several 100 μm to a few mm. As a rule, these organisms are embedded in a gel, for example agarose, which is in turn located in a glass capillary tube. The glass capillary tube is introduced into a water-filled specimen chamber from above or from below and the specimen presses a piece out of the capillary. The specimen in the agarose is illuminated with a light sheet and the fluorescence is imaged onto a camera by means of a detection objective which—preferably, but not necessarily—is perpendicular to the light sheet and thus also perpendicular to the illumination objective of an optical system for generating a light sheet.

However, this method of light sheet microscopy is subject to certain limitations. Firstly, the specimens to be examined are relatively large; they originate from developmental biology. Secondly, because of the specimen preparation and the dimensions of the specimen chamber, the light sheet is relatively thick and thus the achievable axial resolution is limited. Thirdly, the preparation of the specimens is laborious and not compatible with standard specimen preparations and standard specimen holders, such as are usual for individual cells in fluorescence microscopy.

In order to partially avoid these limitations, in recent years a novel setup has been implemented, in which the illumination objective and the detection objective are preferably perpendicular to each other and are directed onto the specimen from above at an angle of 45°. Such procedures are described, for example, in WO 2012/110488 A1 and in WO 2012/122027 A1.

As a rule, coherent light of a laser is used to illuminate the specimen. In fluorescence microscopy the wavelength of the light is chosen in dependence on markers which are to be excited to emit fluorescence. In the simplest case, for example, a light beam with an intensity profile which corresponds to a Gaussian function can be shaped into a light sheet statically by means of cylindrical lenses, or quasi-statically by means of scanning and matched integration time of the camera. A structured illumination of the specimen, which can increase the resolution, is advantageous. Thus, the coherent superimposition of Bessel beams is described, for example, in an article by V. Kettunen et al., "*Propagation-invariant spot arrays*", published in Optics Letters 23(16), page 1247, 1998. The superimposition is achieved by calculating a phase element which can be introduced into the pupil with the aid of an algorithm. If the spectrum of a Bessel beam is imaged into the pupil, the phase element generates a plurality of Bessel beams which are superimposed in the specimen. The phase element resembles a star-shaped grating with the phase values 0 and $\pi$. It is specified as a condition that the distances between the individual Bessel beams are preferably to be great as, otherwise, undesired interference effects can result.

In US 2013/0286181 A1 the interference effects between the individual Bessel beams are used in a targeted manner in order to generate an extensive and structured light sheet. Here, the Bessel beams are placed side by side so closely that the side lobes of the individual Bessel beams are destructively superimposed above and below the propagation plane, the light sheet plane. Depending on the distance of the individual Bessel beams from each other, different interference patterns result.

The generation of so-called $sinc^3$ beams is described in WO 2014/005682 A1. An almost box-shaped light sheet with only small side lobes can be generated in the specimen therewith. The $sinc^3$ beam can be described in the frequency domain as the product of three sinc functions:

$$f = f_{vr} f_{vx} f_{vy}$$

-continued with $$f_{vr}(v_r) = \operatorname{sinc}\left[\frac{(v_r - c_r)^2}{w_z}\right],$$

$$f_{vx}(v_x) = \operatorname{sinc}\left[\frac{(v_x - c_x)^2}{w_x}\right], f_{vy}(v_y) = \operatorname{sinc}\left[\frac{(v_y - c_y)^2}{w_y}\right]$$

and $$v_r(v_x, v_y) = \sqrt{v_x^2 + v_y^2}.$$

The coefficients $c_r$, $c_x$ and $c_y$ indicate the position of the sinc$^3$ beam in the pupil plane; the coefficients $w_x$, $w_y$ and $w_z$ indicate the width of the sinc$^3$ beam in the respective direction.

The Fourier transform of this function f yields the complex electric field EF of the light sheet. The intensity distribution I in the focus results from I=abs(EF)$^2$; the phase $\varphi$ results at $\varphi$=arg(EF). Sinc$^3$ beams can also be superimposed coherently, with the result that a structured, grating-type light sheet forms.

To generate the beam types described above, spatial light modulators (SLMs) can be used, for example. For Bessel beams this is described, for example, in an article by Rohrbach et al., "*A line scanned light-sheet microscope with phase shaped self-reconstructing beams*", published in Optics Express 18, page 24229 in 2010, with reference to liquid crystal SLMs. There are two types of liquid crystal spatial light modulators, which differ by the liquid crystals used.

Nematic SLMs make a maximum continuously adjustable phase deviation from 0 up to 6π possible. However, these SLMs are relatively slow: as a rule they have frame rates of about 60 Hz, at most of up to 500 Hz. In contrast, the diffraction efficiency of nematic SLMs is over 90%.

On the other hand, there are ferroelectric SLMs, which can only switch back and forth between states without a phase deviation and with a phase deviation of Tr. For this, these SLMs can be switched very rapidly, with the result that frame rates of up to 4000 Hz can be achieved. However, the diffraction efficiency, at about 14%, is very low.

Both SLM types have in common the fact that the achievable phase deviation depends on the wavelength of the irradiated laser light. A nematic SLM should ideally be calibrated such that it has a continuous phase deviation from 0 up to an entire wavelength, thus 2π. This phase deviation can, however, only be set at a single wavelength, for which it is then designed. As soon as the SLM is irradiated with a laser of a different wavelength, the phase deviation changes and is not equal to 2π. At a shorter wavelength the phase deviation becomes larger; at a longer wavelength the phase deviation decreases.

The behaviour of a ferroelectric SLM is similar. Here too, the phase deviation of π is only achieved at the wavelength for which the pattern represented on the SLM is designed. At different wavelengths the phase deviation differs from Tr. This has direct effects on the generation of the above-named Bessel or sinc$^3$ beams, thus these beams can be generated optimally only when the phase deviation continuously varies between 0 and 2π, as is necessary for Bessel and Mathieu beams, or when the phase deviation is exactly π, as is the case for coherently superimposed Bessel or sinc$^3$ beams.

For analysis by means of fluorescence microscopy, a specimen is often prepared with different markers which can each make different structures of the specimen visible. It is therefore desirable to excite the specimen with light sheets of different wavelengths in light sheet microscopy. When a spatial light modulator is used for the beam shaping, an optimal multi-colour excitation can be implemented if the individual differently coloured light sheets are irradiated sequentially and the phase pattern is adapted to the SLM when the wavelength changes. For example, in a first pass the SLM is set to a first laser wavelength and an image stack is recorded in the z direction, the detection direction, at this wavelength. After that the SLM is set to a second wavelength and once again an image stack is recorded at this wavelength. However, this method has the disadvantage that the recording of the image stack can take a relatively long time, up to several tens of seconds. If the specimen moves or changes during this time, the differently coloured image stacks no longer match and cannot be combined to form a total image.

Alternatively, each individual image of the image stack can first be recorded at the different wavelengths before the next image of an image stack is recorded. However, this has the disadvantage that, with exposure times of about 10 ms, the optimization of the spatial light modulator to the new laser wavelength is preferably to take place about 100 times a second. With normal nematic SLMs this cannot be achieved. Ferroelectric SLMs, with their low light efficiency and the limited phase deviation, are preferably to be used.

In the not previously published DE 10 2014 119 255, a method is described with which multi-coloured light sheets can be generated with only a single phase mask, as a rule an SLM, wherein a common phase distribution is predefined for all wavelengths which are used for the illumination. This enables a rapid sequential or even simultaneous illumination with illumination light of several colours. Disadvantageously, the phase distribution is not then optimal for every wavelength but is determined for a preferred wavelength. The more the wavelengths of the illumination light differ from this, the greater the losses in quality of the respective light sheet are. For example, they can differ in their thickness, or in the occurrence of side lobes, which under certain circumstances has the result that it is not possible to compare the measurement results for different dyes with each other directly or to relate them to each other.

DESCRIPTION OF THE INVENTION

Summary

The object of the invention is to provide a method which makes it possible to illuminate a specimen with a multi-coloured light sheet of different wavelengths simultaneously or sequentially over a very short time with static phase modulation, with the result that several colours can be detected at the same time and the duration of recording is reduced compared with a sequential excitation, wherein nematic SLMs are preferably also to be used because of their high diffraction efficiency, and wherein the quality of the light sheet is to be as high as possible and as identical as possible for each of the wavelengths.

This object is achieved for a method for examining a specimen by means of light sheet microscopy, by selecting several illumination wavelengths, of which illumination light for the specimen is composed.

As a rule, the illumination wavelengths are selected on the basis of the experiment to be carried out, for example in dependence on the dyes with which a specimen is marked and on what fluorescence is to be excited. For the structuring of the illumination light, a predefined phase distribution is impressed on the phase-selective element for each of the illumination wavelengths and a predefined aperture structure is preferably also impressed on an aperture in an aperture plane. This can be effected, for example, in that, in a first step, in the focal plane of an illumination objective for a light sheet of predefined shape, its electric field is determined with light of the respective illumination wavelength. The phase distribution to be predefined in each case is calculated from this; it is the argument of the complex electric field $\varphi = \arg(EF)$ with the phase $\varphi$. For the determination or calculation of the electric field of the light sheet, it is assumed that for the preferred wavelength a middle or central range—based on the position of the light sheet in the aperture plane—is faded out, in order to likewise exclude from the calculation the zero order which in reality is preferably to be removed to generate a structured light sheet. Here too, the middle range based on the position of the light sheet is therefore removed, with the result that the aperture structure removes the zero order of the structured light of the respective illumination wavelength.

The calculation of the electric field in the focus of the illumination objective can, for example, be effected via a Fourier transform of the so-called pupil function, i.e. of the electric field in the frequency domain, on the basis of its distribution in the pupil. Each of the predefined phase distributions is then impressed on the phase-selective element in its own selection area, assigned to the respective illumination wavelength, which does not overlap with the other selection areas. The phase-selective element is preferably located in the intermediate image. If it is a static phase-selective element, such as for example a phase plate, this is produced accordingly. Different phase plates can be held ready for different quantities of wavelengths, and then introduced into the beam path in dependence on the chosen illumination wavelengths. Controllable phase-selective elements, such as for example—preferably nematic—spatial light modulators, are controlled and set accordingly.

Further adjustment measures can optionally be carried out. For example, the phase distribution can be multiplied by an envelope function perpendicular to the light sheet plane. In this way, the thickness of the light sheet can be set, in addition side lobes perpendicular to the light sheet plane can be suppressed. The phase distributions can also be adapted for impression on the phase-selective element by dimensional scaling such that the spectrum in the pupil corresponds to that initially calculated, or the light sheet has predefined dimensions in the specimen.

The phase-selective element is then illuminated with illumination light in or near to an intermediate image plane in an illumination beam path. Only light of the respective illumination wavelength is directed onto each selection area. This can be effected in that either each illumination wavelength is provided with its own beam path which runs separately from the beam paths for the other illumination wavelengths to the phase-selective element, or by splitting a beam or beam path common to all illumination wavelengths into individual beam paths assigned in each case to one illumination wavelength. In dependence also on the number of different illumination wavelengths, the beam splitting can, for example, be effected by one or more beam splitters, then arranged for example sequentially, adapted to the illumination wavelengths, or also by dispersive or diffractive elements, which deflect the illumination light differentiated spectrally or split it spectrally.

The illumination light is structured by the phase-selective element, wherein this structuring is effected for each illumination wavelength in the assigned selection area, but not in the other selection areas. Light of a predefined illumination wavelength is only directed onto the assigned selection area. After the structuring, the light of the different illumination wavelengths is combined to form a common beam which is coupled into the illumination objective thereafter. Prior to this, the structured illumination light can be imaged into an aperture plane, arranged downstream of the phase-selective element, in which a frequency spectrum of the illumination light of the respective illumination wavelength is generated. This imaging can be effected after the combination to form a common beam. An adaptation of the aperture structure is then effected such that the zero orders of the structured illumination light of the respective illumination wavelength are substantially removed in the aperture plane, whereby, in a focal plane of an illumination objective arranged downstream, a structured, multi-coloured light sheet is shaped, or a structured light sheet of the respective illumination wavelength with a light sheet plane which is perpendicular to the focal plane of the illumination objective. The specimen is subsequently illuminated with the structured light sheet of the respective illumination wavelength in the light sheet plane and light emitted by the specimen is detected in a detection device. The detection device forms an angle different from zero with the light sheet plane. This angle is preferably chosen at 90° since this enables the best possible separation of illumination and detection. However, smaller angles are also possible, for example 30° or 70°, in particular when the structural circumstances do not permit a right angle. Depending on the design, the light of the different illumination wavelengths can be directed onto the phase-selective element sequentially or simultaneously, meaning that the specimen is illuminated either sequentially or quasi-simultaneously or simultaneously with light sheets of different colours.

The aperture in the aperture plane can be further adapted in a different way. If, for example, a dimensional scaling is carried out, an aperture adjustment can ensure that precisely the zero orders of the superimposed light are removed. Another possibility for adjusting the aperture is to remove undesired side lobes of the pupil function.

In this way, an illumination apparatus for light sheet microscopy is adjusted such that, when using light of the illumination wavelengths, it generates a light sheet structured in the best possible way for each of these illumination wavelengths, with the result that a simultaneous or quasi-simultaneous excitation of the specimen with several wavelengths is made possible.

The input beam, for example a Gaussian laser beam, can preferably be collimated elliptically in order, on the one hand, to keep the light output in a zero order as low as possible and, on the other hand, to influence the light sheet only as little as possible.

For example, a diffractive optical element can be used as phase-selective element. This can be formed statically as a phase plate, wherein the corresponding selection areas for the selected illumination wavelengths are impressed on the phase plate. Here, only one single adaptation to particular wavelengths is effected. Different phase plates can then be inserted into the beam path for different combinations of illumination wavelengths. Another possibility is to use a spatial light modulator (SLM) as diffractive optical element. This offers the advantage that, via a control, it can be set to different illumination wavelengths without a change being necessary; in addition, different beam shapes for the respective light sheets can be implemented with an SLM. During the analysis of the specimen, however, the properties of the spatial light modulator (SLM) are not altered. The SLM behaves statically.

However, the phase-selective element can also, as an assembly, be composed of several individual elements, for example small phase plates which only cover part of the beam path, wherein each individual element comprises in each case one selection area assigned to a particular illumination wavelength. These individual elements can then be arranged either next to each other in the beam path or one behind the other. If the phase-selective elements—such as for example phase plates—are constructed statically, as a rule several phase plates are provided with which different combinations of illumination wavelengths can be used depending on the examination configuration. These can then be exchanged in the beam path mechanically or by motor, for example several phase plates can be arranged on a filter wheel.

Advantageously, in addition, for each selection area, the modulation depth is fixed at $\pi$ in dependence on the illumination wavelength. Therefore, the phase deviation can be set at $\pi$ for each selection area; as a rule, this is effected using control voltages in the case of an SLM.

Therefore, the phase deviation is then optimal for each selection area: in the case of a phase deviation of $\pi$ the diffraction efficiency is at its highest and the whole of the incident laser radiation is manipulated, i.e. redistributed into a desired beam shape. In the case of a modulation depth differing from $\pi$, the diffraction efficiency would decrease and a part of the laser output would be redistributed into the zero order. If there is no phase deviation or there is only a phase deviation by a multiple of $2\pi$, the entire laser output is diffracted into the zero order, with the result that the desired beam shape is not generated.

If a spatial light modulator (SLM) is used, adaptations can be carried out in the beam path itself more easily, for example different envelope functions can be multiplied by the phase distributions impressed on the selection areas in the direction perpendicular to the light sheet plane and further settings are thus carried out. A dimensional scaling can also be carried out more simply on an SLM.

While a beam with a Gaussian intensity profile is often used as input beam, which is collimated and directed onto the phase-selective element, for the calculation of the electric field of the light sheet shapes are preferably applied which are better suited to a uniform illumination or structured illumination of the specimen than a Gaussian light beam, which can, of course, likewise be used to calculate the electric field of the light sheet.

In a preferred embodiment, the electric field of the light sheet is therefore determined by using at least two $\text{sinc}^3$ beams, which are coherently superimposed in the focal plane of the illumination objective, to shape the light sheet. Here, the electric field of the light sheet in the specimen, i.e. in the focal plane, is calculated by Fourier transform starting from the pupil function specified at the start. The phase is determined from the electric field resulting in the focal plane, the superimposition field, and impressed on the phase-selective element for each illumination wavelength exclusively in the assigned selection area. An important advantage of $\text{sinc}^3$ beams is that they can be used to form an almost box-shaped light sheet with uniform illumination in the specimen, with only slightly pronounced side lobes. In the case of coherent superimposition, a structured, grating-like light sheet can be generated, wherein the properties of the light sheet have the same quality for each colour due to the fact that for each illumination wavelength its own selection area is used.

In another preferred design, the electric field of the light sheet is determined by using Bessel beams of a predefined shape to shape the light sheet. For such a Bessel beam, the electric field in the focal plane is determined and a superimposition of this electric field and identical electric fields which are spaced apart from each other in each case by a predefined amount $\Delta$ in the focal plane is arithmetically determined. The distance $\Delta$ is varied until an optimal light sheet is set, i.e. the side lobes of the individual Bessel beams are preferably superimposed destructively, with the result that a light sheet which is long and thin in cross section with only small side lobes forms.

Further details on the beam shaping and also on the basic setup of corresponding beam-shaping modules, which can also be transferred to the use of a single illumination wavelength, are described in DE 10 2014 119 255, already mentioned at the beginning and not previously published, the content of which is fully incorporated here and to which express reference is made.

The invention in addition also relates to a light sheet microscope which is capable of illuminating a specimen with a multi-coloured light sheet, which is suitable in particular to implement the previously described method. Such a light sheet microscope comprises an illumination apparatus, which generates coherent illumination light for several illumination wavelengths. The light sheet microscope also comprises a beam-shaping module for generating a light sheet from illumination light, an illumination objective for the illumination of a specimen with the light sheet and a detection objective for imaging light which is emitted by the specimen onto a laminar detector, wherein the optical axis of the detection objective forms an angle different from 0° and from 180°, preferably an angle of 90°, with the optical axis of the illumination objective.

The beam-shaping module of the named light sheet microscope comprises, for the achievement of the object, a phase-selective element on which several selection areas separated from each other spatially are arranged, wherein in each case one selection area is assigned to a specific illumination wavelength. In addition, the beam-shaping module comprises means for the sequential or simultaneous selection and illumination of the selection areas in dependence on the respective illumination wavelength. The selection areas are designed as has already been described previously in connection with the method. The selection areas do not overlap each other and a phase distribution predefined for the respective illumination wavelength is impressed on each selection area.

The phase-selective element is then arranged in or near to an intermediate image plane in the illumination beam path. It is preferably formed as a diffractive optical element, particularly preferably as a spatial light modulator (SLM), preferably as a nematic SLM. However, it can also be formed as a phase plate or, as an assembly, be composed of several individual elements, for example several smaller phase plates, wherein in each case one illumination wavelength is assigned to each individual element.

The means for the sequential or simultaneous selection and illumination of the selection areas in dependence on the respective illumination wavelength can be implemented in different ways, wherein it is assumed in the following that the beam path for all illumination wavelengths is a common beam path at least in the area before the phase-selective element in the beam-shaping module, i.e. before the illumination light strikes the phase-selective element a spectral separation of the illumination light into the illumination wavelengths is preferably to be effected, corresponding to the selection of the selection areas. Before the coupling into the illumination objective, the separate optical paths of the light of the individual illumination wavelengths are brought back together, for which reason the beam-shaping module also comprises means for combining the beams of light of the illumination wavelengths.

In one design of the light sheet microscope, the means for the sequential selection of a selection area comprise an optical path selection element arranged between a light source and the phase-selective element for deflecting the light onto the respective selection area in dependence on the illumination wavelength. In addition, the means for the sequential selection of a selection area comprise a segmented mirror, arranged downstream of the phase-selective element and made up of several segments, which reflects the incident light back onto the selection area of the phase-selective element assigned to the respective illumination wavelength. In each case one segment is assigned to one illumination wavelength. In addition, a $\lambda/4$ plate, likewise belonging to the means for the sequential selection, is arranged between segmented mirror and phase-selective element, wherein the phase-selective element is designed not to modify the phase of the light in the case of a first polarization direction and is designed to modify the phase in the case of a second polarization direction perpendicular to the first.

In the case of this embodiment example, the selection areas are selected sequentially, i.e. light of the different illumination wavelengths is coupled one after the other into the illumination beam path, but not of several illumination wavelengths at the same time. The change can be effected so rapidly that, as a result, a quasi-simultaneous illumination with a multi-coloured light sheet can be achieved. In dependence on the respective illumination wavelength, the optical path selection element deflects the light into the assigned selection area. The optical path selection element can, for example, be a switchable mirror, the angle of which to the optical axis of the incident light beam can be changed depending on the illumination wavelength used. The setting can be effected, for example, via a control unit, which is connected directly to the emission sources, for example lasers in a laser module, with the result that the corresponding angle is automatically set depending on the coupled-in light source. The use of firmly arranged, static optical path selection elements is also conceivable, for example a prism or a combination of prisms, glass plates or other dispersive elements can be used, or also diffractive elements, wherein a simultaneous selection is also possible when dispersive and diffractive elements are used. It is important that the phase-selective element arranged downstream of the optical path selection element in the beam path is arranged such that in each case only light of the assigned illumination wavelength strikes the corresponding selection area and the light of other illumination wavelengths does not strike the selected selection area, but strikes the selection areas assigned to these wavelengths.

From the phase-selective element, the light is guided onto the segmented mirror where it is reflected back in the direction of the phase-selective element. The segmented mirror is constructed in such a way that in each case one segment is assigned to one selection area and light coming from this selection area is reflected back precisely into this selection area. The individual segments are, for example, flat mirror surfaces. Since the $\lambda/4$ plate is arranged between phase-selective element and segmented mirror, the light beam passes through it twice, with the result that the polarization of the returning light beam is rotated by 90° vis-à-vis the original polarization when it strikes the phase-selective element. The $\lambda/4$ plate therefore acts like a $\lambda/2$ plate during a single pass.

The phase-selective element is aligned corresponding to the polarization directions, with the result that, in a first of the two polarization directions of the light, the light in the selection areas is not modified and, in the second of the two polarization directions, the light is modified. If the light is not modified, the phase-selective element only acts reflectively as a mirror. The polarization is preferably set such that the phase-selective element first of all acts on the light coming from the optical path selection element like a mirror and, on the return path, when the polarization is rotated by 90°, in a phase-manipulating manner. In principle, a reversed sequence is also conceivable, however the preferred variant has the advantage that a lens system with a shorter focal length can be used for the subsequent imaging of the phase pattern, which is as a rule in the intermediate image or near to it. The phase-modified light coming from the selection areas can be coupled back into the beam path via the optical path selection element and separated from the unstructured illumination light which is coming directly from the light sources via a polarizing beam splitter, for example.

In another design of the light sheet microscope, the means for the simultaneous selection of a selection area comprise one or more deflecting elements which are selective with respect to the colour of the light and are arranged between a light source and the phase-selective element.

Each of the deflecting elements is assigned in each case to one illumination wavelength and is arranged to direct only light of this illumination wavelength onto the respective selection area. A plane mirror is arranged downstream of the phase-selective element and a $\lambda/4$ plate is arranged between plane mirror and phase-selective element. Here too, the phase-selective element does not modify the phase of the light in the case of a first polarization direction and does modify the phase in the case of a second polarization direction perpendicular to the first, as has already been described in connection with the previously named embodiment. In both cases, a corresponding input polarization of the light is preferably to, of course, be ensured. Although the arrangement according to this embodiment example is preferably suited to the simultaneous selection of a selection area, i.e. for simultaneous illumination, it can also be used for a sequential selection of a selection area. Dichroic beam splitters and—only possible in the last link in a chain of beam splitters, which the light passes through sequentially—mirrors can be used, for example, as deflecting elements. If, for example, only two illumination wavelengths are used, one dichroic beam splitter is sufficient. Light of the illumination wavelength assigned to the beam splitter is directed into the corresponding selection area by means of the beam splitter, light of the second illumination wavelength passes through the beam splitter and strikes a mirror which—since incident light has only this illumination wavelength—directs the light only of this illumination wavelength onto the selection area. Instead of a mirror in the last link in the chain, a further beam splitter can, of course, also be used. Providing that the beam splitters are not arranged in series but the light has previously been split onto different beam paths, for example without spectral splitting, the use of a mirror is not possible as a rule unless it is covered with a special colour-splitting layer.

In a preferred embodiment of this light sheet microscope, impressed on each selection area is a blazed grating which is designed to modify the angle of reflection of the light in the case of the second polarization direction. In this way, an additional angular deflection for example onto the return path of the light can be achieved, with the result that a simpler coupling-out becomes possible via a mirror and a polarizing beam splitter can be dispensed with.

In another embodiment, the means for the simultaneous selection of a selection area of the light sheet microscope comprise one or more input deflecting elements which are arranged between a light source—which can be composed, for example, of several lasers and emits light of the illumination wavelengths—and the phase-selective element and are selective with respect to the colour. Each of the input deflecting elements is assigned in each case to one illumination wavelength and is arranged to direct light of this illumination wavelength onto the respective selection area. These input deflecting elements serve for the spectral splitting of the beam according to illumination wavelength; they are arranged upstream of the phase-selective element. One or more output deflecting elements are likewise arranged downstream of the phase-selective element, wherein each of the output deflecting elements is again assigned in each case to one illumination wavelength and deflects light from the respective selection area. In both cases the input and output deflecting elements can be, for example, dichroic beam splitters, which can also be constructed identically. Input and output deflecting elements can also be identical, i.e. the light strikes the respective input and output deflecting element twice, with a corresponding configuration of mirrors. In addition, the input and output deflecting elements can be configured such that they deflect several wavelengths, for example using corresponding coatings. With respect to the use of mirrors, reference is made to the statements regarding the previously described embodiment example. In this embodiment example, a double pass with different polarization can be avoided by means of the phase-selective element, possible residual modulations due to a rotation of polarization by not exactly 90° can thus be avoided.

To compensate for differences in path length between paths of the light of the individual illumination wavelengths, compensating elements, which generate an additional glass path for example, can be arranged between the phase-selective element and the output deflecting elements, with the result that the light sheets in the specimen are simultaneously superimposed spatially and the same specimen areas are excited. Alternatively, however, such a path length compensation can also be effected by superimposing the predefined phase distribution with corresponding defocusing terms.

In a development of such a configuration, in which in each case one input deflecting element is used which is identical to the output deflecting element, the means for the selection of a selection area comprise at least one dichroic beam-splitting element, arranged between a light source and the phase-selective element, which separates the incident light into at least one reflected partial beam and one transmitted partial beam and represents the combined input and output deflecting elements.

For example, three illumination wavelengths can be used when two partial beams are reflected, which can be achieved through a corresponding design of the dichroic beam-splitting element. It is then preferably formed as a plane-parallel plate with two parallel large areas, which the incident light strikes. A first colour-splitting layer is formed on or applied to the first large area and a second colour-splitting layer is formed on or applied to the second large area. The two colour-splitting layers act selectively, i.e. reflectively, for different illumination wavelengths or ranges of illumination wavelengths—the latter is advantageous in the case of a sequential arrangement of such beam-splitting elements.

This embodiment preferably also comprises a first deflecting mirror and a second deflecting mirror, wherein the phase-selective element is positioned between the two deflecting mirrors. The first deflecting mirror directs the at least one reflected partial beam onto the phase-selective element; the second deflecting mirror directs the transmitted partial beam onto the phase-selective element. Several dichroic beam-splitting elements can also be connected in series, with the result that more and more illumination wavelengths are coupled out of the transmitted and/or reflected beam successively. The arrangement of the deflecting mirrors with respect to the phase-selective element and the at least one dichroic beam-splitting element is effected such that the first deflecting mirror directs the transmitted partial beam coming from the phase-selective element and the second deflecting mirror directs the reflected partial beam coming from the phase-selective element in each case back onto the at least one dichroic beam-splitting element and, in this way, the partial beams cover the same optical path in the beam-shaping module. This can be achieved by a corresponding arrangement of the mirrors relative to the phase-selective element and the beam-splitting element.

In a further embodiment of the light sheet microscope, the means for the selection of a selection area finally comprise a dispersive or diffractive optical element, arranged between a light source and the phase-selective element, which deflects light of each of the illumination wavelengths at a different angle. An imaging element is optionally also arranged between the dispersive or diffractive optical element or the phase-selective optical element, wherein the diffractive or dispersive optical element and the phase-selective element are each arranged in or near to a focal plane of the optional optical imaging element, and wherein the phase-selective element is designed to reflect the light into the imaging element with phase modification. Instead of the optional optical imaging element, a second diffractive or dispersive optical element can also be used; a beam displacement between the entering and emerging light beam can be achieved with both.

For example, the dispersive optical element can be a prism and the diffractive optical element can be a grating. The use of a plane-parallel glass plate is also possible if the plate is arranged tilted with respect to the direction of the incident light beams. The angular dispersion in the transition from air into the medium and when emerging from the dispersive medium back into air leads to a colour-dependent parallel displacement of the light beams. Alternatively, a movable mirror can also achieve a rapid sequential splitting. By means of the dispersive or diffractive optical element, light of the illumination wavelengths is impinged on at different angles according to its colour.

If an optical imaging element is used, the dispersive optical element or the diffractive optical element respectively is arranged as near as possible to or in the focal plane of the imaging element—for example a concave mirror. Accordingly, after passage through the dispersive or diffractive optical element, the angular splitting leads to a locational splitting of the different colours. The phase-selective element is likewise located as near as possible to or in a focal plane of the optical imaging element, with the result that each colour is focussed onto the corresponding selection area. In this case, the phase-selective element also acts reflectively and, after the phase manipulation, the beams are combined again on the return. In order to separate the entering beam from the exiting beam for each illumination wavelength, the phase-selective element can preferably be arranged tilted with respect to the optical path of the incident light, with the result that, in the dispersive or diffractive optical element, a beam displacement is generated between entering and exiting beam for each of the illumination wavelengths. Alternatively—when a λ/4 plate arranged between phase-selective element and optical imaging element is used—the change in polarization direction and a polarizing beam splitter, arranged in the beam path, which is arranged between the light sources and the optical dispersive or diffractive element, can also be used.

It is understood that the features named above and those yet to be explained below can be used not only in the stated combinations but also in other combinations or alone, without departing from the scope of the present invention.

BRIEF DESCRIPTION OF THE DRAWINGS

The invention is explained in yet more detail below by way of example with reference to the attached drawings. There are shown in.

DETAILED DESCRIPTION OF THE DRAWINGS

Figure 1:
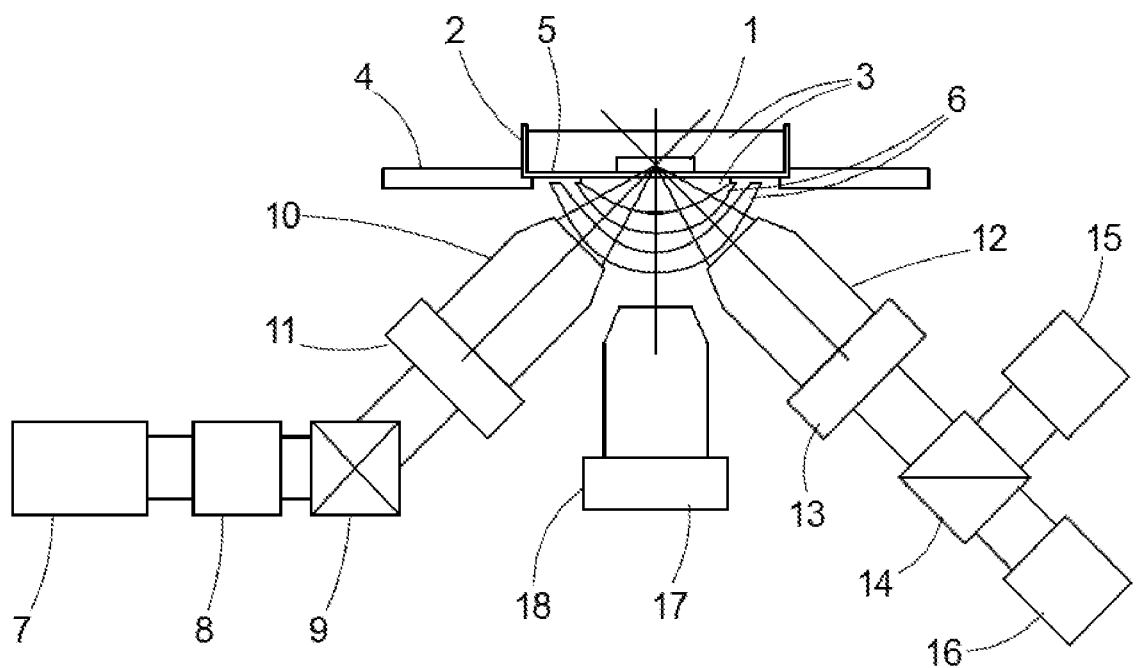
FIG. 1 the schematic setup of an inverted light sheet microscope according to an embodiment of the present application, FIG. 2 a phase-selective element with several selection areas according to an embodiment of the present application, FIG. 3 the schematic setup of a light sheet microscope with a beam-shaping module according to an embodiment of the present application, FIG. 4 a first design of a beam-shaping module according to an embodiment of the present application, FIG. 5a other designs of a beam-shaping module according to an embodiment of the present application, FIG. 5b other designs of a beam-shaping module according to an embodiment of the present application FIG. 6a further designs of a beam-shaping module according to an embodiment of the present application, FIG. 6b further designs of a beam-shaping module according to an embodiment of the present application, FIG. 7a again other designs of a beam-shaping module according to an embodiment of the present application, and FIG. 7b again other designs of a beam-shaping module according to an embodiment of the present application.

Firstly, FIG. 1 shows the basic setup of a light sheet microscope which can be used to examine a specimen by means of light sheet microscopy. The light sheet microscope is here shown in an inverse configuration, this is only to be understood by way of example, light sheet microscopes in which the specimen is viewed from above or from the side are also possible designs. A specimen 1 is located in a specimen chamber 2 and is surrounded by a liquid 3, for example water or a culture medium. The specimen chamber 2 has side walls and a base made of glass with a predefined thickness; the thickness corresponds for example to that of a usual microscope slide, for example 0.17 mm. The specimen chamber 2 is mounted on a microscope stage 4; the microscope stage is movable manually or by motor in all three spatial directions. The individual elements of the light sheet microscope are arranged underneath the specimen chamber 2, which has a transparent base 5. Between the objectives of the light sheet microscope and the base 5 of the specimen chamber 2 there is a so-called virtual relay 6 with an inner and an outer lens. Between the inner lens of the virtual relay 6 and the base 5 of the specimen chamber there is likewise the liquid 3. Between the inner and the outer lens of the virtual relay 6 there is the surrounding atmosphere, air as a rule, likewise between the outer lens of the virtual relay 6 and the objectives of the light sheet microscope.

The virtual relay 6 serves to compensate for aberrations which form because the optical axes of the illumination and detection objectives are not perpendicular to the base 5 of the specimen chamber 2. Instead of a virtual relay 6, other correction mechanisms such as auxiliary lenses or freeform lenses which are integrated into the objectives can also be used if such a correction is necessary.

The illumination beam path is represented on the left-hand side. Light from an illumination module, for example a laser module 7—for example several lasers of different wavelengths can be accommodated here and a selection can be made between different wavelengths, wherein several wavelengths can also be selected at the same time—is directed, via a beam-shaping module 8 and a scanning module 9—which, for example, can be used to generate a quasi-static light sheet and/or for angular scanning—onto an illumination objective 10, which images the light sheet into the light sheet plane, which here contains the optical axis of the illumination objective, in the specimen. The focus of the illumination objective 10, i.e. the point at which the light sheet has the thinnest extent, can be shifted with the aid of a drive, for example a piezo drive 11. Alternatively, the microscope stage 4 can also be moved.

An example of a detection beam path is depicted on the right-hand side. It comprises a detection objective 12, which, analogously to the illumination objective 10, can be shifted by means of a drive, here a piezo drive 13. The optical axis of the detection objective 12 forms an angle different from zero, here a right angle, with the light sheet plane in which the optical axis of the illumination objective 10 lies. However, this is not strictly necessary in order for the process to function, an angle different from zero between the plane of the light sheet and the optical axis of the detection objective 12 is sufficient. Fluorescent light emitted by the specimen 1 is directed onto different detection modules 15 and 16 through the detection objective 12 via a beam splitter 14. In the case of illumination of the specimen simultaneously or quasi-simultaneously with a light sheet comprising several wavelengths, the detection can be carried out differently according to the wavelengths, for example. In the detection modules 15, 16 there are, as a rule, laminar detectors, which record the intensity and convert it into a corresponding electrical signal which then flows into an image processing. The arrangement for light sheet microscopy is completed by an overview objective 17, which can be moved via a piezo drive 18.

The overview objective 17 serves firstly to capture an overview of the specimen and to select a region of interest (ROI), onto which illumination and detection can then be focussed.

Figure 2:
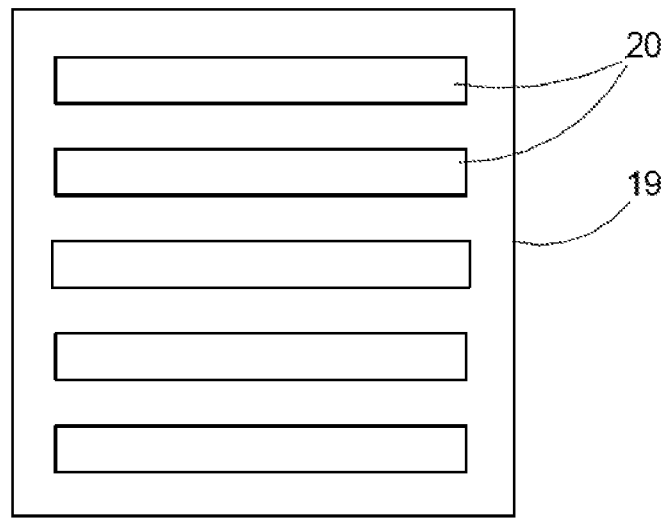

FIG. 2 shows a phase-selective element 19. Phase distributions predefined for different illumination wavelengths used for the illumination are impressed on this phase-selective element 19. These illumination wavelengths are selected on the basis of the specific demands of the analysis; illumination light for the specimen 1 is composed of the illumination wavelengths. The phase distributions are predefined in that, in the focal plane of the illumination objective 10 for a light sheet of predefined shape, its electric field is determined with light of the respective illumination wavelength, and therefrom the phase distribution to be predefined in each case is calculated, wherein, in an aperture plane, a middle range based on the position of the light sheet is removed, with the result that the aperture structure removes the zero order of the structured light of the respective illumination wavelength.

Such a phase distribution is determined for each illumination wavelength. Each of the predefined phase distributions is impressed on the phase-selective element 19 in its own selection area 20, assigned to the respective illumination wavelength, which does not overlap with the other selection areas 20. On the phase-selective element 19 in FIG. 2 here five such selection areas 20 are represented, corresponding to five possible illumination wavelengths. Each of the phase distributions is optimized for the respective illumination wavelength, i.e. the phase deviation is set in each case at π for this wavelength and only this wavelength is taken into consideration in the determination of the phase distribution. The phase-selective element 19 is illuminated with illumination light in or near to an intermediate image plane in the illumination beam path, wherein only light of the respective illumination wavelength is directed onto each selection area 20 and structured by the phase-selective element before the light of the different illumination wavelengths is combined to form a common beam. The illumination light structured in this way is imaged into an aperture plane which is arranged downstream of the phase-selective element and in which a frequency spectrum of the illumination light of the respective illumination wavelength is generated. The aperture structure is then preferably adapted such that the zero orders of the structured illumination light of the respective illumination wavelength are substantially removed in the aperture plane, whereby, in a focal plane of the downstream illumination objective 10, a structured light sheet of the respective illumination wavelength is formed, in fact with a light sheet plane which is perpendicular to the focal plane of the illumination objective 10. The specimen 1 is then illuminated with the structured light sheet of the respective illumination wavelengths, as a rule therefore a superimposition of several monochromatic light sheets, in the light sheet plane; the illumination can be effected simultaneously or also quasi-simultaneously, i.e. changing very rapidly, for the different colours. Light emitted by the specimen 1 is detected in a detection device, wherein the detection direction forms an angle different from zero with the light sheet plane.

Spatial light modulators (SLMs) can be used, for example, as phase-selective elements 19. The use of one or more phase plates with firmly impressed phase distributions is also possible since the phase patterns are optimized once for the respective wavelength and do not then need to be altered again, with the result that fixed phase distributions optimized to individual wavelengths, which have been impressed on one phase plate or several phase plates, can also be used instead of an SLM. The predefined beam shape can be a $sinc^3$ beam for example but Bessel beams and Mathieu beams can also be used. Small phase plates can also be used as individual elements on which in each case only one selection area is impressed, which are then arranged in the beam path one below the other, optionally also slightly offset spatially to compensate, for example, for path differences.

A rapid change between the illumination wavelengths or a simultaneous illumination with several illumination wavelengths can then be effected by selecting the respective pattern in the optical path. Then, for each selection area its own optical path can be established, which—for a rapid sequential illumination—is selected, for example, via a movable mirror using a rapid optical switch. Alternatively, colour-splitting optical elements can also be used, with which the beam paths can be split into different paths for different colours. In the latter case, the corresponding light path is selected solely through the selection of the illumination wavelength which is used for the excitation. Here too, the selection can be effected simultaneously or sequentially. The colour-splitting elements can comprise dispersive or diffractive elements or dichroic beam splitters, for example.

FIG. 3 shows once again a light sheet microscope in an overview with the elements, some of which are important for the beam shaping. Here, the light sheet microscope is shown in an upright configuration, in contrast to FIG. 1. With the beam-shaping module 8, the beam is shaped as desired and imaged into an interface 21, which is located such that the Fourier transform of the desired beam is generated there. This can then be imaged, for example, onto a scanning mirror 22 in the scanning module 9 by means of a 4f imaging. The scanning mirror 22 is in turn imaged into the pupil of the illumination objective 10; in this way, the light sheet can be spread out in the specimen 1 by a rapid scanning movement. The detection is effected as usual by the detection objective 12 which is here oriented substantially perpendicular to the light sheet. Thereafter, a separation of the colours and multi-channel detection, as is known per se in the state of the art, can be effected via colour splitters and, for example, several cameras, which are each equipped with laminar detectors.

The light sheet microscope also comprises an illumination apparatus, which here comprises a laser module 7 and generally generates coherent illumination light for several illumination wavelengths. The light sheet is generated from illumination light in the beam-shaping module 8.

Figure 3:
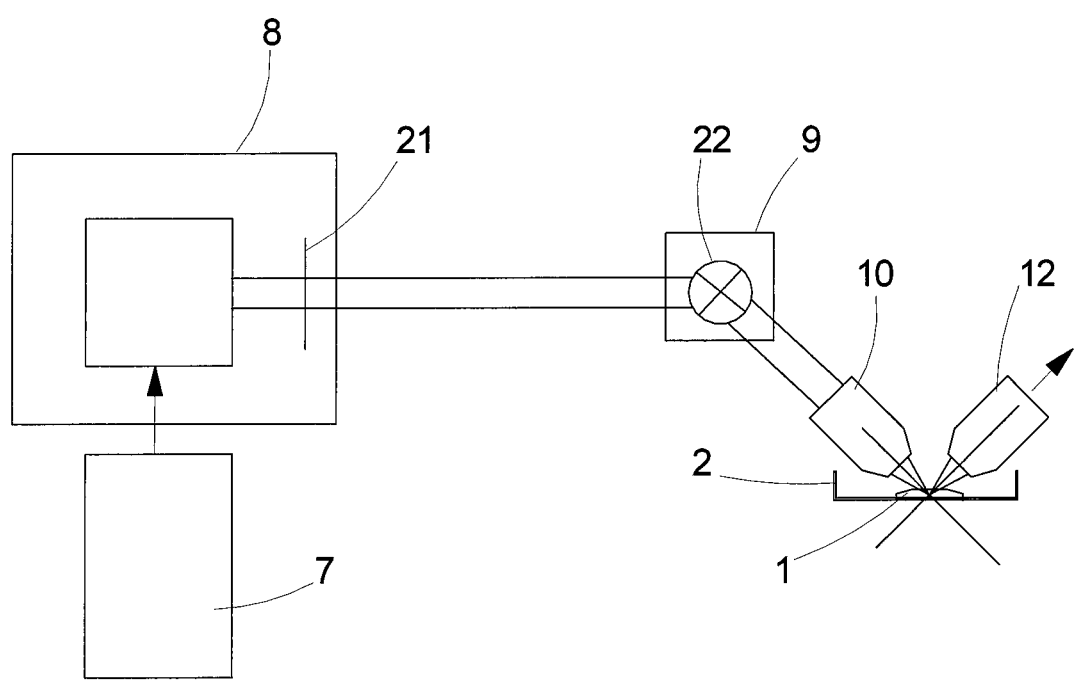

The beam-shaping module 8 comprises a phase-selective element, such as for example the phase-selective element 19 from FIG. 2, on which several selection areas 20 separated from each other spatially are arranged, wherein in each case one selection area 20 is assigned to a specific illumination wavelength. A phase distribution predefined for the respective illumination wavelength is impressed on each selection area 20. By means of the illumination objective 10, the specimen is illuminated with a light sheet, the detection objective 12 images light which is emitted by the specimen onto a laminar detector, wherein, depending on the number of illumination wavelengths, a beam splitting into several colours to be detected can be effected, wherein such a laminar detector is assigned to each colour channel. With reference to FIG. 3, the optical axis of the detection objective 12 here forms a right angle with the optical axis of the illumination objective 10 since this is most favourable for the observation conditions, but other configurations in which the angle is smaller or larger are also possible, as long as it is not 0° or 180°.

The beam-shaping module 8 in particular also comprises means for the sequential or simultaneous selection of the selection areas 20 in dependence on the respective illumination wavelength, i.e. also means for the spectral splitting of the illumination light before the phase manipulation and means for the subsequent combining. These are to be explained in more detail with reference to the following FIGS. 4-7.

Figure 4:
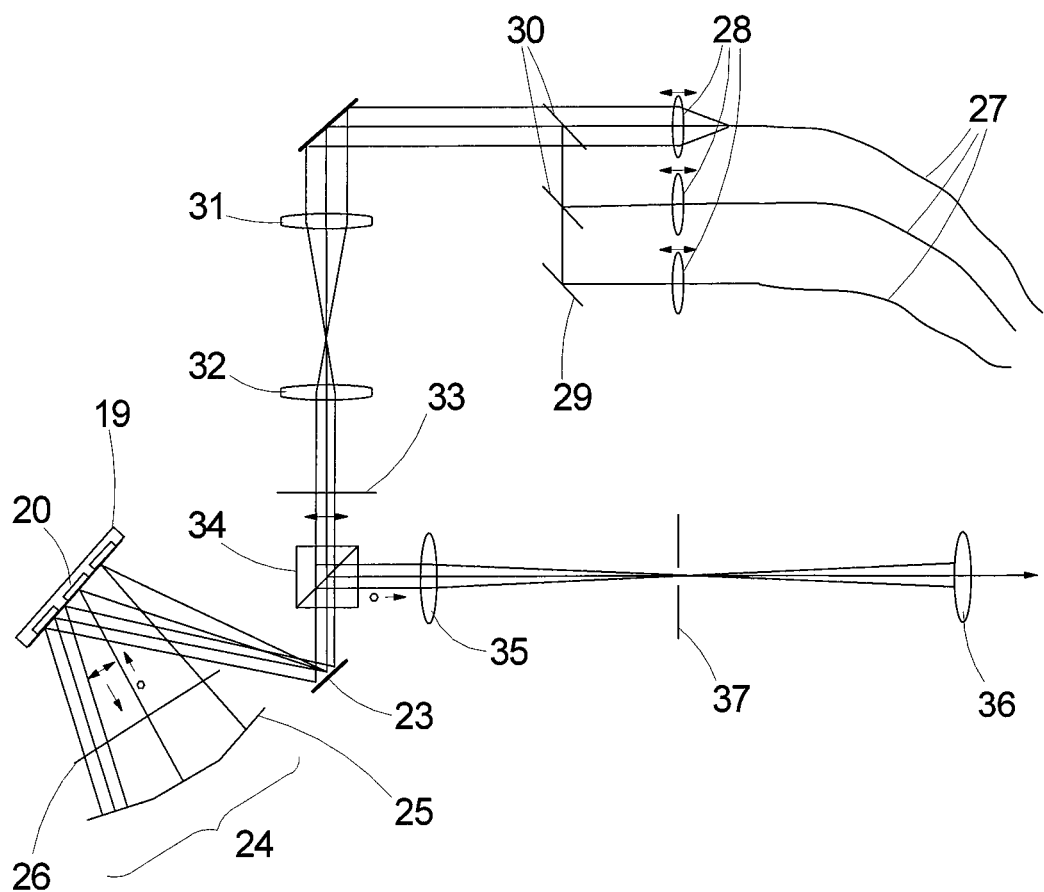

In one embodiment of the light sheet microscope, which is predominantly designed for the sequential selection of a selection area 20, the means for the sequential selection and illumination of such a selection area 20 comprise an optical path selection element arranged between a light source, for example the laser module 7, and the phase-selective element 19 for deflecting the light onto the respective selection area 20 in dependence on the illumination wavelength. Such a design is shown in FIG. 4. For the rapid sequential selection of the predefined phase distributions in the selection areas 20 on the phase-selective element 19, for example an SLM, an illumination scanning mirror 23 is used here; this represents the optical path selection element. It is coupled to a control unit which switches the outputs of the lasers, for example with the aid of acousto-optic elements. A segmented mirror 24 made of several segments 25 is arranged downstream of the phase-selective element 19. The segments 25 are formed as plane-mirror surfaces which are arranged at predefined angles to each other to form the segmented mirror 24, wherein in each case one segment 25 is assigned to one illumination wavelength, with the result that the light that is incident on the segmented mirror 24 is reflected back onto the selection area 20 of the phase-selective element 19 assigned to the respective illumination wavelength, wherein previously only light from the respective selection area 20 was directed onto an assigned segment 25 by means of reflection.

A λ/4 plate 26 is arranged between the phase-selective element 19 and the segmented mirror 24. The phase-selective element 19 is formed such that it does not modify the phase of the light in the case of a first polarization direction and does modify the phase in the case of a second polarization direction perpendicular to the first. This presupposes that the irradiated light is correspondingly polarized, in addition the phase-selective element 19 is preferably to be aligned corresponding to the polarization directions.

Light from individual laser light sources 27 is collimated into a beam with a Gaussian intensity profile via collimators 28. Via a mirror 29 or dichroic beam splitters 30, the light of the individual illumination wavelengths is merged and reduced in size in one axis by means of a telescope which comprises two cylindrical lenses 31 and 32, with the result that the selection areas 20 are optimally illuminated with the phase distributions. The longer side of the selection areas 20 is located perpendicular to the paper plane, i.e. the light sheet plane is likewise perpendicular to the paper plane. The light of the illumination wavelengths is then aligned by means of a λ/2 plate 33 such that a following polarizing beam splitter 34 is passed through without hindrance. This is shown here, without limiting the generality, for a polarization in the sheet plane, labelled with the double arrow between λ/2 plate 33 and polarizing beam splitter 34 as well as between phase-selective element 19 and λ/4 plate 26. In this case, the phase-selective element 19 is to be aligned such that it behaves passively, that is it acts reflectively for the light coming from the illumination scanning mirror 23, without influencing the phase of the light. The light of each illumination wavelength passes through the λ/4 plate 26, is reflected by the respective segment 25 of the segmented mirror 24 and again passes through the λ/4 plate 26 which in this way ensures that the polarization of the illumination light is rotated by 90° when it strikes the phase-selective element for a second time—labelled with the circle, which is intended to symbolize a polarization perpendicular to the sheet plane—and the phase distribution in the selection area 20 located at this position now acts on the light. The reversed sequence, i.e. first the manipulation of the phase and, after rotation of the polarization, in the return a purely reflective action, is also conceivable. However, the procedure shown here has the advantage that, for the subsequent imaging— the illumination light of each of the illumination wavelengths passes the illumination scanning mirror 23 again, strikes the polarizing beam splitter 34, where it is now deflected because of the changed polarization directions—a lens 35 with a shorter focal length can be used in order to image the phase pattern out of the intermediate image plane. The lens 35 generates the Fourier transform of the desired beam in the plane of an optional aperture 37. The optional aperture 37 can be used in order to filter out undesired spatial frequencies which can form, for example, through diffraction at the pixels of an SLM. Through 4f systems connected thereto, symbolized here in summary by a lens 38, the frequency spectrum can be imaged onto a scanner and then into the pupil of the illumination objective 10.

Chromatic effects in the illumination, i.e. on the optical path between the collimators 28 and the phase-selective element 19, can be compensated for by different collimation states, for example. Different optical path lengths can be compensated for by optical correction elements, for example, or by superimposing the beam-shaping phase pattern with a corresponding defocusing term. According to the position of the illumination scanning mirror 23, the laser wavelengths can be switched via a control device, for example via acousto-optic elements in the laser module 7.

Figure 5:
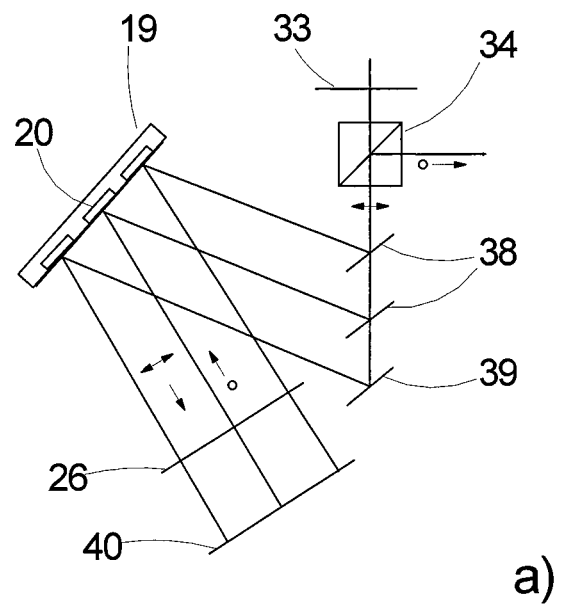
Figure 5:
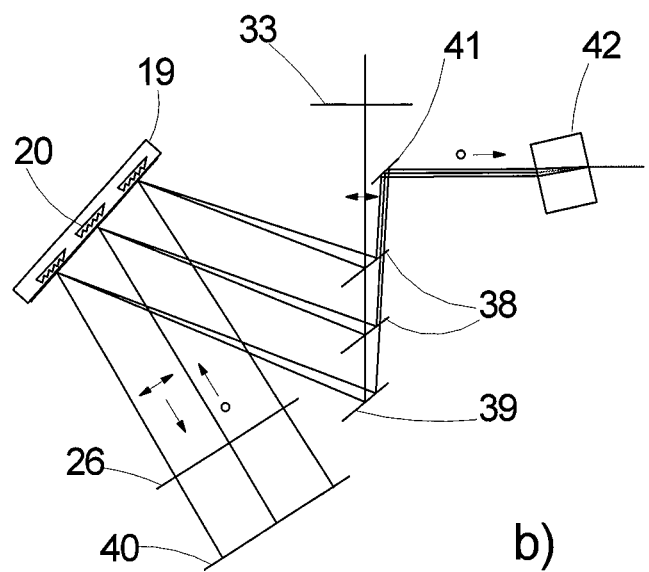
Figure 6:
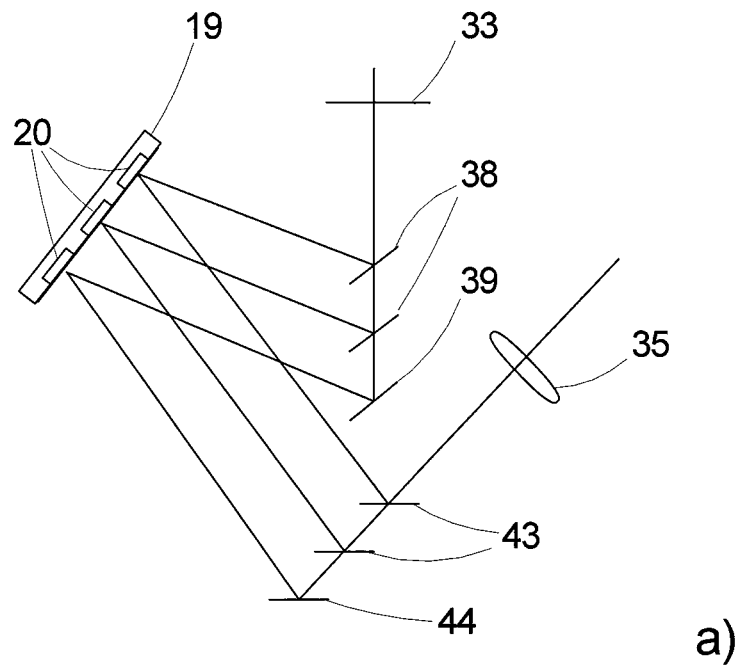
Figure 6:
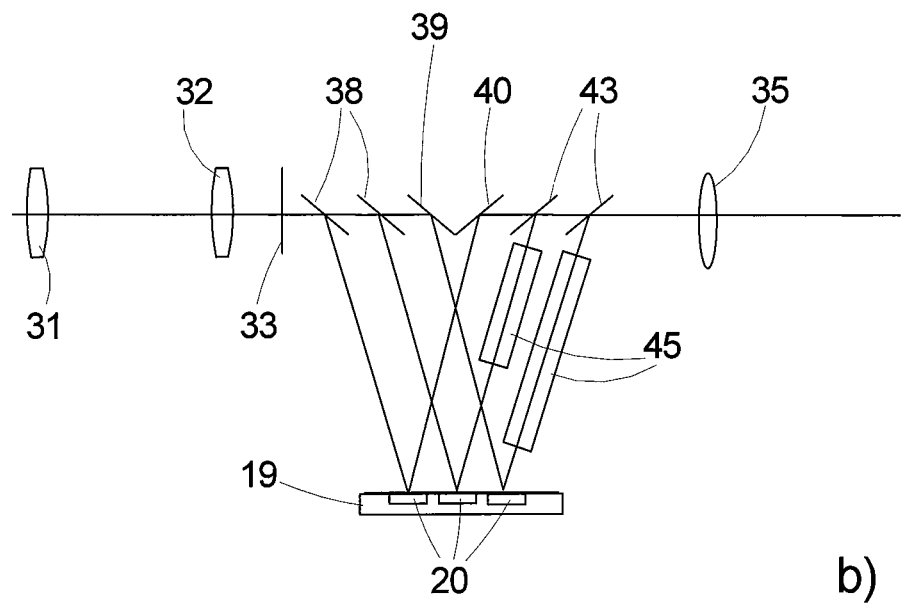
Figure 7:
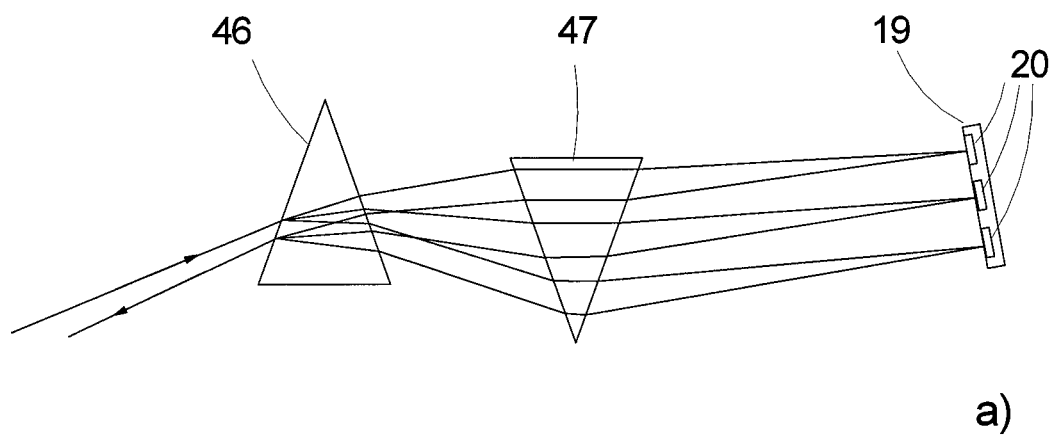
Figure 7:
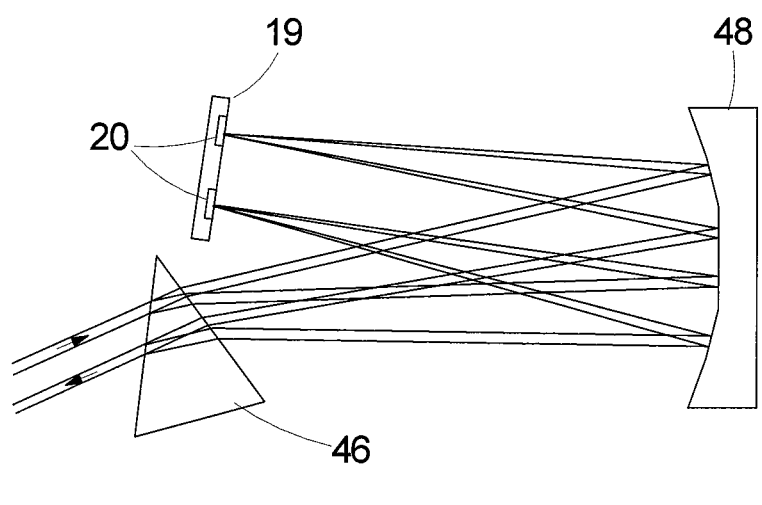

In another embodiment which is described in connection with FIGS. 5 a), b), the means for the simultaneous selection and subsequent illumination of a selection area 20 comprise one or more selective deflecting elements arranged between a light source and the phase-selective element 19. Each of the deflecting elements is assigned in each case to one illumination wavelength and directs light onto the respective selection area 20. In this example, three illumination wavelengths are used but there can also be more or fewer. These deflecting elements are designed as dichroic beam splitters 38 in the example shown in FIGS. 5 a), b). A mirror 39 ensures that wavelengths not previously selected are likewise supplied to the phase-selective element 19. Here, the deflecting elements will be passed through one after the other by way of example, with the result that, after passing through the second deflecting element, only light of one illumination wavelength remains and the mirror 39 likewise acts as a deflecting element assigned to a single illumination wavelength. In each case, a beam splitter 38 can also be used instead of the mirror 39, in particular when the deflecting elements are not to be arranged one after the other in the beam path. A plane mirror 40 is arranged downstream of the phase-selective element 19 and a λ/4 plate 26 is arranged between plane mirror 40 and phase-selective element 19. Analogously to the embodiment shown in FIG. 4, the phase-selective element 19 does not modify the phase of the light in the case of a first polarization direction and does modify the phase in the case of a second polarization direction perpendicular to the first. The mode of operation and the beam progression in the embodiment shown in FIG. 5a) is analogous to the embodiment already described in connection with FIG. 4. The difference is that here one or more dichroic beam splitters 38 and one mirror 39 are used in order to generate for each predefined phase distribution, i.e. for each illumination wavelength, its own optical path. The polarization is set by means of λ/2 plate 33 such that the phase-selective element 19, for example an SLM, behaves passively on the forward path, i.e. not influencing the phases, and only acts as a simple mirror. Because of the spatial beam splitting, instead of the segmented mirror 24, in the embodiment shown in FIGS. 5a) and b), a simple plane mirror 40 can be used. The λ/4 plate 26 ensures a rotation of the polarization between the forward path and the return path, i.e. for a rotation of the polarization by 90° before striking the phase-selective element 19 for a second time, wherein the phase pattern located at this position then acts on the illumination.

In the variant shown in FIG. 5a), the coupling-out of the light, which is to be directed into the illumination objective 10, is again effected by a polarizing beam splitter 34. In the embodiment shown in FIG. 5b), in addition to the beam-shaping phase pattern, a blazed grating is impressed on the phase distribution which only acts in one of the two polarization directions, preferably the same polarization direction as the phase pattern, therefore, for example, in the pass on the return path. This blazed grating leads to an additional angular deflection and thus to a spatial separation of the excitation beam path—the beam path between phase-selective element 19 and illumination objective 10 or specimen 1—and illumination beam path—the part of the beam path which is located between the laser module 7 and the phase-selective element 19. Because of the separation, the beam can be coupled out by a further mirror 41 instead of by the polarizing beam splitter 34. The angular deflections forming due to the additional blaze terms, which are impressed on the phase distributions, can be merged again and superimposed thereafter by a dispersive element. In the case of the same additional angular deflection, as shown in FIG. 5b), a parallel displacement of the beams of the illumination wavelengths results after reflection at the mirror 41; the beams can be merged again by a plane-parallel glass plate 42 tilted with respect to the beam direction, i.e. arranged at an angle different from 90°, for example. If, on the other hand, the same blaze term is impressed on the phase patterns for each illumination wavelength, because of the same grating constant, the deflection is effected at different wavelengths, with the result that the structured light beams used for the illumination have slightly different angles after leaving the phase-selective element 19. The dispersive element is then preferably designed as a prism.

It is advantageous to superimpose the useful radiation of different illumination wavelengths, that is to generate a common light path, since the light sheets are thus also superimposed in the specimen and thus the same specimen areas are excited simultaneously both in terms of space and time. However, this superimposition is not strictly necessary, in particular deviations which are only manifested in the light sheet plane can be tolerated.

In a further embodiment which is described in connection with FIGS. 6a) and b), the means for the simultaneous selection of a selection area 20 comprise one or more selective input deflecting elements arranged between a light source—for example the laser module 7—and the phase-selective element 19, wherein each of the input deflecting elements is assigned in each case to one illumination wavelength and is arranged to direct light onto the respective selection area 20. For beam combining, the beam-shaping module 8 in turn comprises one or more output deflecting elements arranged in series and downstream of the phase-selective element 19. Each of the output deflecting elements is also assigned in each case to one of the illumination wavelengths and deflects light which is reflected phase-modified out of the respective selection area 20.

In contrast to the arrangements described previously, in the arrangements described in FIGS. 6a) and 6b), the use of a polarizing beam splitter is omitted, with the result that the phase-selective element 19 only needs to be approached once. Nevertheless, the light requires a defined polarization direction, which is produced by means of the λ/2 plate 33. Here, as in the other arrangements described in connection with FIGS. 4 and 5, the phase-selective element 19 is aligned in each case in relation to this polarization direction. In principle, of course, all of the arrangements for the simultaneous selection of selection areas 20 can also be used to select a selection area 20 sequentially, if this should be required. In the embodiment examples shown in FIGS. 6a) and 6b), one or more dichroic beam splitters 38 are also used in order to establish different optical paths for the different illumination wavelengths or selection areas. The input deflecting elements are therefore implemented by the dichroic beam splitters 38. A mirror 39 ensures that wavelengths not previously selected are likewise supplied to the phase-selective element 19. In analogy to FIG. 5a) and FIG. 5b), the mirror 39 here likewise acts as input deflecting element because of the sequential arrangement shown by way of example, however, a dichroic beam splitter 38 can also be used in its place. However, in contrast to the arrangements shown in FIG. 5a) and FIG. 5b), here one set of output deflecting elements is used, here dichroic beam splitters 43 and a mirror 44, which are arranged downstream of the phase-selective element 19 in the beam path. With the aid of the output deflecting elements, the dichroic beam splitters 43 and the mirror 44, a combined beam is again generated from beams of the three illumination wavelengths used here by way of example. In this way, the double pass over the phase-selective element 19 can be dispensed with and, in this way, possible residual modulations which can occur if the polarization rotation is not exactly 90°, are avoided. The selective input deflecting elements can be constructed identically to the output deflecting elements or, in the case of corresponding beam guiding, also be identical to the output deflecting elements. In particular, by a corresponding setup with two deflecting mirrors and a dichroic beam-splitting element as combined input and output deflecting element, which has two surfaces which are parallel to each other, but which are provided with different colour-splitting layers, a splitting of three illumination wavelengths can be achieved which all cover the same optical path when the phase-selective element (19) is located between the two deflecting mirrors.

In the example shown in FIG. 6b), between the phase-selective element 19 and the output deflecting elements, compensating elements 45 are additionally arranged for compensating for differences in path length between paths of the light of the individual illumination wavelengths. These compensating elements 35 are formed, for example, as simple glass bodies. However, the compensation can also be effected by superimposing the beam-shaping phase pattern with a corresponding defocusing term. In this way, the variant shown in FIG. 6b) makes possible a compact on-axis setup of the beam-shaping module.

In a further embodiment of the beam-shaping module 8 of the light sheet microscope, the means for the selection of a selection area 20 comprise a dispersive or diffractive optical element, arranged between a light source and the phase-selective element 19, which deflects light of each of the illumination wavelengths at a different angle, as well as optionally an optical imaging element arranged between the dispersive or diffractive optical element and the phase-selective element 19, wherein the dispersive or diffractive optical element and the phase-selective element 19 are arranged in each case in or near to a focal plane of the imaging element. The phase-selective element 19 reflects the light back into the imaging element with phase modification. The use of the imaging element is only optional.

This embodiment is to be explained in more detail in the following in connection with FIG. 7a) and FIG. 7b). Here, for each of the colours the establishing of their own beam paths, with the result that the light of the respective illumination wavelength only strikes the phase-selective element 19 on the assigned selection area 20, is achieved with the aid of two dispersive elements designed as prisms 46. The fact that the beams of different illumination wavelengths pass through different optical path lengths is additionally utilized. By tilting the phase-selective element 19 in the beam path with respect to the optical path of the incident light, a beam displacement is generated when emerging from the prism 46 on the return path. Another simple possibility is to use a plane-parallel glass plate, wherein the angular dispersion in the transition from air into the medium and when emerging from the dispersive medium leads to a colour-dependent parallel displacement of the beams. The use of a diffractive optical element instead of a prism, for example a grating, is also conceivable and has the same effect; in both cases it is a static setup.

In the arrangement shown in FIG. 7*b*), only one dispersive element, a prism 46, is used, and additionally an imaging element, here a concave mirror 48, arranged between the prism 46 and the phase-selective element 19. This is a so-called 4f arrangement, i.e. the location of the angular splitting—the entry surface of the prism facing away from the concave mirror—is located in or near to a focal plane of the concave mirror 48. Similarly, the phase-selective element 19 is also located in or near to a focal plane of the concave mirror 48. Because of the placing of the prism 46—alternatively a grating can also be used or the splitting can also be effected sequentially, for example with the aid of a movable mirror—essentially a locational splitting of the light of the different illumination wavelengths results from the angular splitting after reflection at the concave mirror 48. Because of the position of the phase-selective element, light of each illumination wavelength is again focussed separately in one direction by the concave mirror 48, i.e. in each case only focussed onto the associated selection area 20. After the phase manipulation at the phase-selective element 19, where the light is reflected modified, the beams are combined again on the return path to the exit surface of the prism 46 which faces away from the concave mirror 48 and corresponds to the entry surface mentioned previously.

In order to separate the entering beam from the exiting beam, for example a locational displacement can be chosen which is implemented here by an angular displacement of the phase-selective element 19 in the paper plane. The locational displacement can, however, also be generated perpendicular to the paper plane; alternatively, a separation according to polarization state can also be carried out, as has already been described in connection with FIG. 4 and FIG. 5.

Multi-coloured light sheets can be generated with the previously described means, wherein, for each of the colours, the light sheet is shaped in the best possible way with respect to the thickness and the suppression of artefacts and the structuring. With a given wavelength and numerical aperture of the illumination objective 10, a light sheet with as small as possible a thickness is generated for each colour utilizing the maximum diffraction efficiency of the phase-selective element 19 used.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMBERS

1 Specimen
2 Specimen chamber
3 Liquid
4 Microscope stage
5 Transparent base
6 Virtual relay
7 Laser module
8 Beam-shaping module
9 Scanning module
10 Illumination objective
11 Piezo drive
12 Detection objective
13 Piezo drive
14 Beam splitter
15, 16 Detection module
17 Overview objective
18 Piezo drive
19 Phase-selective element
20 Selection area
21 Interface
22 Scanning mirror
23 Illumination scanning mirror
24 Segmented mirror
25 Segment
26 $\lambda/4$ plate
27 Laser light source
28 Collimator
29 Mirror
30 Dichroic beam splitter
31, 32 Cylindrical lens
33 $\lambda/2$ plate
34 Polarizing beam splitter
35, 36 Lens
37 Aperture
38 Dichroic beam splitter
39 Mirror
40 Plane mirror
41 Mirror
42 Glass plate
43 Dichroic beam splitter
44 Mirror
45 Compensating element
46, 47 Prism
48 Concave mirror

The invention claimed is:

1. A light sheet microscope, comprising:
an illumination apparatus that generates coherent illumination light having several illumination wavelengths;
a beam-shaping module that generates a light sheet from the illumination light;
an illumination objective for illumination of a specimen with the light sheet;
a detection objective for imaging light emitted by the specimen onto a laminar detector, wherein an optical axis of the detection objective forms an angle different from 0° and 180° with an optical axis of the illumination objective;
wherein the beam-shaping module comprises a phase-selective element arranged in or near an intermediate plane and having a plurality of selection areas that are separated from each other spatially;
wherein one selection area of the plurality of selection areas is assigned to one specific illumination wavelength of the several illumination wavelengths;

wherein a phase distribution predefined for the one specific illumination wavelength is impressed on the one selection area;

wherein the beam-shaping module comprises selecting means for sequentially or simultaneously selecting the selection areas in dependence on the respective illumination wavelength; and wherein the selecting means is formed to direct light of the respective illumination wavelength onto an assigned selection area.

2. The light sheet microscope according to claim 1;
wherein the phase-selective element comprises a plurality of individual elements, and
wherein each individual element is assigned to one illumination wavelength.

3. The light sheet microscope according to claim 1;
wherein the selecting means comprises:
   an optical path selection element for deflecting the light onto the respective selection area in dependence on the illumination wavelength arranged between a light source and the phase-selective element; and
   a segmented mirror comprising a plurality of segments arranged downstream of the phase-selective element, the segmented mirror reflecting the incident light onto the selection area of the phase-selective element which is assigned to the illumination wavelength;
wherein one segment is assigned to one illumination wavelength, and a λ/4 plate is arranged between the segmented mirror and the phase-selective element; and
wherein the phase-selective element is designed not to modify a phase of the light in the case of a first polarization direction and is designed to modify the phase in the case of a second polarization direction perpendicular to the first.

4. The light sheet microscope according to claim 1;
wherein the selecting means comprises at least one selective deflecting element arranged between a light source and the phase-selective element;
wherein each of the deflecting elements is assigned to one illumination wavelength and is arranged to direct light onto the respective selection area, a plane mirror arranged downstream of the phase-selective element and a λ/4 plate arranged between plane mirror and phase-selective element; and
wherein the phase-selective element is designed not to modify a phase of the light in the case of a first polarization direction and is designed to modify the phase in the case of a second polarization direction perpendicular to the first.

5. The light sheet microscope according to claim 4;
wherein impressed on each selection area is a blazed grating which is designed to modify an angle of reflection of the light in the case of the second polarization direction.

6. The light sheet microscope according to claim 1;
wherein the selecting means comprises at least one selective input deflecting element arranged between a light source and the phase-selective element;
wherein each of the input deflecting elements is assigned to one illumination wavelength and is arranged to direct light onto the respective selection area;
wherein the selecting means, for beam combining, further comprises at least one output deflecting element arranged downstream of the phase-selective element; and wherein each of the output deflecting elements is assigned in each case to one illumination wavelength and deflects light out of the respective selection area.

7. The light sheet microscope according to claim 6;
wherein, between the phase-selective element and the output deflecting elements, compensating elements are arranged for compensating for differences in path length between paths of the light of the individual illumination wavelengths.

8. The light sheet microscope according to claim 1;
wherein the selecting means comprises at least one dichroic beam-splitting element arranged between a light source and the phase-selective element for separating the incident light into at least one reflected partial beam and one transmitted partial beam.

9. The light sheet microscope according to claim 8;
wherein the selecting means further comprises a first deflecting mirror, which deflects the at least one reflected partial beam onto the phase-selective element, and a second deflecting mirror, which deflects the transmitted partial beam onto the phase-selective element; and
wherein the phase-selective element is formed reflective and is positioned in a beam path between the two deflecting mirrors.

10. The light sheet microscope according to claim 8;
wherein the dichroic beam-splitting element is formed as a plane-parallel plate with two parallel large areas;
wherein a first colour-splitting layer is applied to a first large area and a second colour-splitting layer is applied to a second large area; and
wherein the two colour-splitting layers act reflectively for different illumination wavelengths or ranges for illumination wavelengths.

11. The light sheet microscope according to claim 1;
wherein the selecting means further comprises a dispersive or diffractive optical element arranged between a light source and the phase-selective element, the dispersive or diffractive optical element being capable of deflecting light of each of the illumination wavelengths at a different angle.

12. The light sheet microscope according to claim 11, further comprising:
an optical imaging element arranged between the dispersive or diffractive optical element and the phase-selective element;
wherein the dispersive or diffractive optical element and the phase-selective element are each arranged in or near to a focal plane of the optical imaging element; and
wherein the phase-selective element is designed to reflect the light into the optical imaging element with phase modification.

13. The light sheet microscope according to claim 12;
wherein the phase-selective element is arranged in the beam path tilted with respect to the optical path of the incident light, with a result that, in the dispersive or diffractive optical element, a beam displacement is generated between entering and exiting beam for each of the illumination wavelengths.

14. The light sheet microscope according to claim 12;
wherein the optical imaging element comprises a concave mirror.

15. The light sheet microscope according to claim 11;
wherein the dispersive or diffractive optical element comprises a glass plate, a prism, or a grating.

16. A method for examining a specimen by light sheet microscopy, comprising:
- selecting several illumination wavelengths for composing illumination light for the specimen;
- impressing a predefined phase distribution on a phase-selective element for each of the illumination wavelengths, wherein each of the predefined phase distributions is impressed on the phase-selective element in its own selection area, which is assigned to the respective illumination wavelength and does not overlap with the other selection areas;
- illuminating the phase-selective element with illumination light in or near to an intermediate image plane in an illumination beam path, wherein only light of the respective illumination wavelength is directed onto each selection area and structured by the phase-selective element before the light of the different illumination wavelengths is combined to form a common beam,
- shaping, in a focal plane of a downstream illumination objective, a structured light sheet of the respective illumination wavelength with a light sheet plane which is perpendicular to a focal plane of the illumination objective, and
- illuminating the specimen with the structured light sheets of the respective illumination wavelengths in the light sheet plane, and
- detecting light emitted by the specimen in a detection direction which forms an angle different from zero with the light sheet plane.

17. The method according to claim 16;
wherein an electric field of the light sheet is determined by coherently superimposing at least two sinc³ beams in the focal plane of the downstream illumination objective to shape the light sheet, and calculating the electric field resulting in the focal plane.

18. The method according to claim 16, further comprising:
- determining an electric field of the light sheet by using Bessel beams of predefined shape to shape the light sheet;
- determining the electric field of such a Bessel beam in the focal plane; and
- arithmetically determining a superimposition of this electric field and identical electric fields spaced apart from each other in each case by a predefined amount Δ in the focal plane.

19. The method according to claim 16;
wherein a diffractive optical element is used as phase-selective element.

20. The method according to claim 19;
wherein the diffractive optical element comprises a spatial light modulator.

21. The method according to claim 16;
wherein the phase-selective element, as an assembly, is composed of several individual elements, and each individual element comprises one selection area assigned to an illumination wavelength.

22. The method according to claim 16;
wherein, for each selection area, a modulation depth is fixed at π in dependence on the illumination wavelength.

23. The method according to claim 16;
wherein the specimen is illuminated in the light sheet plane simultaneously or sequentially with the structured light sheets of the respective illumination wavelengths.

24. The method according to claim 16;
wherein the structured illumination light is imaged into an aperture plane which is arranged downstream of the phase-selective element and in which a frequency spectrum of the illumination light of the respective illumination wavelength is generated, and the aperture structure is adapted such that zero orders of the structured illumination light of the respective illumination wavelength are substantially removed in the aperture plane.

25. The method according to claim 24;
wherein a predefined phase distribution is impressed on a phase-selective element for each of the illumination wavelengths, in that in the focal plane of an illumination objective for a light sheet of predefined shape, its electric field is determined with light of the respective illumination wavelength, and therefrom the phase distribution to be predefined in each case is calculated;
wherein, in the aperture plane, a middle range based on a position of the light sheet is removed, with a result that the aperture structure removes the zero order of the structured light of the respective illumination wavelength.

* * * * *